United States Patent
Hlousek et al.

[11] Patent Number: 6,135,285
[45] Date of Patent: Oct. 24, 2000

[54] DARK-BOX FOR STORING LIGHT-SENSITIVE STORAGE LAYER RADIATION SCREENS

[75] Inventors: Louis Hlousek, Reno, Nev.; Iain H. Hueton, Ogden, Utah; John Lewis, San Ramon, Calif.

[73] Assignee: Dentsply International, York, Pa.

[21] Appl. No.: 08/982,250

[22] Filed: Dec. 1, 1997

[51] Int. Cl.[7] .................................................. B65D 85/48
[52] U.S. Cl. ...................... 206/454; 206/499; 220/4.26; 220/326
[58] Field of Search ............... 206/459.5, 524.1, 206/454, 455, 456, 499, 524.4, 366, 505, 509; 220/326, 571.1, 4.26, 4.27; 378/177, 195; 430/347; 355/113

[56] References Cited

U.S. PATENT DOCUMENTS

| | | |
|---|---|---|
| 3,682,375 | 8/1972 | Partovi-Najafabadi . |
| 3,859,527 | 1/1975 | Luckey . |
| 4,431,139 | 2/1984 | Barnsbee et al. . |
| 4,488,643 | 12/1984 | Pepper ................................. 206/366 |
| 4,663,528 | 5/1987 | Fujiwara et al. . |
| 4,802,618 | 2/1989 | Seto et al. . |
| 5,011,013 | 4/1991 | Meisner et al. ....................... 206/499 |
| 5,014,874 | 5/1991 | Kitsos et al. ......................... 220/908 |
| 5,495,941 | 3/1996 | Leonard ............................... 206/366 |
| 5,630,506 | 5/1997 | Thorne et al. ........................ 206/366 |
| 5,829,588 | 11/1998 | Bloomfield .......................... 206/366 |

FOREIGN PATENT DOCUMENTS

| | | |
|---|---|---|
| 0 288 014 A2 | 10/1988 | European Pat. Off. . |
| 0 301 238 A1 | 2/1989 | European Pat. Off. . |
| 1 904 792 | 8/1970 | Germany . |
| 2719672 A1 | 5/1978 | Germany . |
| WO 93/18435 | 9/1993 | WIPO . |

Primary Examiner—Paul T. Sewell
Assistant Examiner—Nhan T. Lam
Attorney, Agent, or Firm—David J. Weitz; Wilson Sonsini Goodrich & Rosati

[57] ABSTRACT

A container is provided for the storing of light sensitive exposed storage layer radiation screens. The container includes walls defining an interior volume, an aperture in one of the walls sized to allow entry of a storage layer radiation screen, a screen receiving surface adjacent to the aperture which is shaped to direct a dropped screen into and through the aperture into the interior volume, an interior dark section of the container within which light exterior to the container cannot reach, and an interior guiding section that is shaped to direct a screen dropped through the aperture to come to rest in the interior dark section. A method is provided for storing light sensitive exposed storage layer radiation screens. The method includes removing an exposed storage layer radiation screen contained within a screen envelope from a patient's mouth, and releasing the screen from the screen envelope such that the screen drops out of the screen envelope and through an aperture of a container for storing the screen which prevents light exterior to the container from reaching the screen. By following this method, the latent image on the exposed radiation screens is retained while minimizing the risk of transfer of infectious agents which may be present on the screen envelope and user's gloves.

14 Claims, 7 Drawing Sheets

DARK-BOX FOR STORING LIGHT-SENSITIVE STORAGE LAYER RADIATION SCREENS

BACKGROUND OF THE INVENTION

1. Field of the Invention

The present invention relates to a storage container for storing light-sensitive storage radiation screens.

2. Description of Related Art

A variety of storage layer radiation screens have been developed for recording radiation images created by exposing the screen to a radiation source, such as x-rays, α-rays, β-rays, γ-rays, cathode rays and ultraviolet rays. When radiation is passed through an object onto the screen, the radiation forms a latent radiation image on the screen by stimulating the storage layer. This latent radiation image can then be read by scanning the screen using a suitable electromagnetic wave radiation, such as visible light or infrared rays which releases the radiation energy stored in the storage layer as a light emission. The light emitted from the storage layer is then detected and converted into data corresponding to the image. Elimination of the image stored in the storage layer may be accomplished by exposing the storage layer for a period of time to a suitable electromagnetic wave radiation.

One type of storage layer radiation screen stores the radiation image in the form of an electrical charge distribution at a photo semiconductor layer. An example of this type of storage layer is described in *Journal of Applied Photographic Engineering* 4 178–182 (1978) which is incorporated herein by reference. Another type of storage layer radiation screen employs a luminophore, such as a phosphorescent material, which becomes excited when exposed to radiation. When the luminophore is exposed to stimulating rays, such as visible light, the luminophore releases energy in the form of light. Examples of this type of storage layer are described in U.S. Pat. Nos. 3,859,527 and 4,346,295 which are incorporated herein by reference.

As described in U.S. Pat. Nos. 4,258,264, 4,276,473, 4,315,318 and 4,387,428, stimulable phosphors have been proposed for use as luminophores in radiation image recording and reproducing systems. According to these systems, a screen containing a layer of a stimulable phosphor is exposed to radiation which has passed through an object being imaged, such as a part of the human body. The screen is then scanned with stimulating rays, such as a laser beam, which causes the phosphors in the screen to emit light in proportion to the amount of radiation absorbed by the portion of the screen being scanned. The light emitted by the screen is then detected and converted into an electrical signal. The electrical signal is then used to reproduce the radiation image as a visible image.

One particular application for radiation screens employing a storage layer, such as a stimulable phosphor, is in the area of dental radiography. Storage layer radiation screens have the significant advantage of requiring lower x-ray radiation levels to produce the radiation image. As a result, the amount of x-ray radiation that a patient is exposed to when a storage layer radiation screen is used is significantly reduced, thereby reducing the health risks associated with x-ray radiography. In addition, storage layer radiation screens can provide images with higher resolution than are provided by conventional dental x-ray films. U.S. Pat. No. 5,635,728 describes a scanner for reading storage layer screens used in dental radiography and is incorporated herein by reference.

In order for storage layer radiation screens to replace traditional dental radiation screens, it is important that the screens be easy to use. In particular, it is important that the screens be easily transferable from a patient's mouth to a scanner without significant image degradation. Furthermore, it is important that technicians be able to transfer the screens from the patient's mouth to a scanner without contaminating the scanner with infectious agents from the patient's mouth.

Storage layer radiation screens are generally enclosed within a barrier envelope when placed within a patient's mouth for dental imaging. This results in the contamination of the barrier envelope. The barrier envelope may be clear or opaque. Some dental technicians keep the storage layer radiation screen within the envelope during transport to a scanner. This creates the potential for contamination of items and areas away from the operatory. For example, the Soredex Digora scanner requires the technician to insert the storage layer radiation screen, still within the protective envelope, into a slot in the scanner. The technician moves a lever that causes a knife to cut off the end of the envelope. The technician then holds the open envelope up to another slot in the scanner whereby a magnet pulls the radiation screen out of the envelope through the slot into the interior of the scanner. The radiation screen is ejected back out of the same slot after reading. This procedure results in contamination of the knife, scanner, and the storage layer radiation screen. A need exists for a device that allows a technician to remove a screen from a contaminated envelop without contaminating the screen and then to transfer the screen to a scanner in an uncontaminated container.

Dental technicians and scanner operators generally wear gloves to protect themselves from infectious agents from the patients. The need to wear gloves increases the difficulty for the dental technician and scanner operator to handle the screens, remove the screens from the barrier envelopes, and load the screens onto the scanner. A need exists for a device and method which enables the screens to be separated from the barrier envelopes without contaminating the screens, thereby allowing the dental technicians and scanner operators to handle, transport and scan the screens without gloves in safety and without having to repeatedly put on new pairs of gloves.

Some dental technicians transport storage layer radiation screens from the patient to the scanner within a container exposed to ambient room light. This exposure to room light degrades the latent radiation images contained on the screens. Furthermore, transport in such an open manner commonly results in shadowing due to different sections of a screen being exposed to different amounts of light, and thus different degrees of latent image degradation, on the different sections of the radiation screens.

A need exists for a device that allows a technician to transport the light-sensitive storage layer radiation screens from the patient to a scanner within a dark environment protected from ambient light.

SUMMARY OF THE INVENTION

A container is provided for the storing of light sensitive exposed storage layer radiation screens. It is noted that the container can also be used with other forms of image or signal recording media whose image or signal is degraded or erased due to prolonged exposure to ambient light. The container prevents ambient radiation from directly reaching storage radiation screens stored in the container's interior. The container includes walls defining an interior volume, an aperture in one of the walls sized to allow entry of a storage layer radiation screen, a screen receiving surface adjacent to the aperture which is shaped to direct a dropped screen into and through the aperture into the interior volume, an interior dark section of the container within which light exterior to the container cannot reach, and an interior guiding section that is shaped to direct a screen dropped through the aperture to come to rest in the interior dark section. The small size of the aperture reduces the amount of radiation entering the interior of the container and an interior baffle prevents direct radiation from hitting stored radiation screens. Thus, radiation may only reach stored radiation screens after reflecting off of the interior surfaces of the container several times, with each reflection resulting in a substantial attenuation in light intensity.

A method is also provided for storing light sensitive exposed storage layer radiation screens. The method includes removing an exposed storage layer radiation screen contained within a screen envelope from a patient's mouth, and releasing the screen from the screen envelope, without touching the screen, such that the screen drops out of the screen envelope and through an aperture of a container for storing the screen which prevents light exterior to the container from reaching the screen. By following this method, the latent image on the exposed radiation screens is retained while minimizing the risk of transfer of infectious agents which may be present on the screen envelope and user's gloves.

BRIEF DESCRIPTION OF THE DRAWINGS

FIG. 3A illustrates the top piece of the container shown in FIG. 2 as seen from above.

FIG. 3B illustrates the top piece of the container shown in FIG. 2 as seen from below.

FIG. 4A illustrates the bottom piece of the container shown in FIG. 2 as seen from above.

FIG. 4B illustrates the bottom piece of the container shown in FIG. 2 as seen from below.

DESCRIPTION OF THE PREFERRED EMBODIMENTS

The present invention relates to a container and method for storing light-sensitive storage layer radiation screens. The container has walls enclosing an interior volume. The walls include an aperture sized to allow the passage of a storage layer radiation screen from the container exterior into the interior volume. The cross-sectional area of the aperture is chosen to be as small as is practical. The walls are shaped to create an interior dark section within the interior volume that is not directly exposed to the ambient light exterior to the container. The interior surfaces of the container have a low reflectance for the wavelengths of radiation that degrade the latent image on the storage radiation screens. The container also contains a screen receiving surface adjacent to the aperture which is shaped to direct a radiation screen dropped onto the screen receiving surface into and through the aperture into the interior volume. The container further includes an interior guiding section shaped to direct a radiation screen dropped through the aperture such that the screen comes to rest in the interior dark section of the interior volume.

The screen receiving surface is broad enough that a user may drop a radiation screen out of a protective envelope held above the screen receiving surface and have the radiation screen land on the screen receiving surface. This provides the advantage that a technician may drop an exposed storage layer radiation screen from its protective envelope onto the screen receiving surface, and have the radiation screen fall unassisted into the interior volume of the container, i.e., without the technician having to touch either the screen or the container. This minimizes the risk of transferring infectious agents from the protective envelope and the technician's gloves to the radiation screen and/or the container.

The interior dark section and interior guiding section provide the advantage that light sensitive radiation screens dropped onto the screen receiving surface come to rest in a dark environment which minimizes degradation of the latent images present on the screens. This dark environment has the further effect of minimizing the degradation due to shadowing. Shadows occur when one storage radiation screen lies on top of another storage layer screen such that the top screen blocks only a fraction of the bottom screen's surface from the ambient light. The ambient light releases some of the stored energy in the exposed portion of the bottom screen, but does not affect the stored energy in the blocked portion of the screen. Thus the blocked portion of the bottom screen retains a stronger latent image than the exposed section of the screen. This disparity in latent image quality makes it difficult to read the entire screen and can obscure information in the image. The amount of degradation experienced by an exposed storage layer radiation screen depends upon the amount of light energy to which the screen is exposed.

Figure 1:
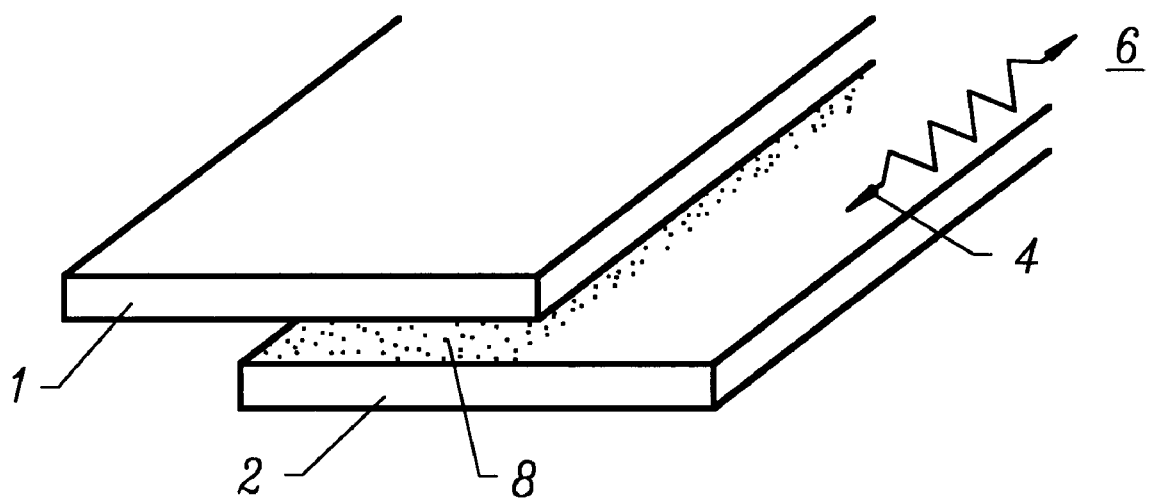
FIG. 1 illustrates a shadowing effect due to improper transport of screens which is avoided by using the container and method of the present invention.

FIG. 1 illustrates a shadow being formed on a first screen 2 due to a second screen 1 partially blocking light 6 from reaching the first screen 2. As illustrated, the first screen 2 has a dark region 8 and a lighter region 4 which was exposed to the light 6.

The interior guiding section and interior dark section preferably are shaped so as to cause a series of radiation screens, when dropped through the aperture, to become stacked upon one another. This has the advantage of preventing the piling of radiation screens with open spaces between them, thus providing more efficient storage of the radiation screens and allowing for the enclosure of a larger number of radiation screens into the interior volume. Preferably the interior guiding section and interior dark section are shaped so as to cause the radiation screens to stack substantially evenly. This provides the advantage of maximum space efficiency in storing the radiation screens. Neat stacking of the radiation screens also minimizes degradation of the latent images caused by shadowing.

In one embodiment the container includes an interior member which is sized and positioned to prevent light passing through the aperture from directly reaching the dark portion of the interior. Because of the interior member, radiation may only reach the stored radiation screens after reflecting several times off of the interior surfaces of the container. The low reflectivity of the interior surfaces for the wavelengths of radiation that degrade the latent images ensures that radiation entering the aperture will be substantially attenuated before reaching the radiation screens.

The screen receiving surface is preferably sized and shaped so as to enable a user to consistently drop radiation screens onto it. Furthermore, the screen receiving surface is preferably shaped so that radiation screens dropped onto it pass through the aperture into the container without the user having to touch or otherwise handle the container. This minimizes the risk of spreading any infectious agents to the screen or container.

The walls of the container are preferably formed out of material that does not transmit radiation of wavelengths that erase or otherwise degrade the latent image on the storage radiation screen. In one embodiment of the present invention, the container walls are formed out of injection molded plastic. Any appropriate non-light-transmissive material could be used. This prevents ambient light exterior to the container from entering the interior volume through the container walls, thus facilitating the creation of the internal dark section. Ambient room light can then only reach the interior volume, if at all, through the aperture. The container may optionally also be formed of a material which prevents the transmission of certain forms of radiation into the container. For example, the container could be made of lead to prevent xrays from entering the container.

In one embodiment the aperture is surrounded by the screen receiving surface. This provides a space-efficient way to guide dropped storage radiation screens to the aperture.

The aperture should be sized for storage radiation screens used in dental imaging. In a particular embodiment the aperture is sized with a width of at least 0.18 inches and a length of at least 2.125 inches. This sizing allows for the passage of dental X-ray screen sizes 0 to 3.

In one embodiment the internal dark section is sized so as to allow the storage of at least twenty dental storage radiation screens. This provides enough internal dark section volume to store at least one full mouth series of radiation screens. This is advantageous since some patients undergo a full mouth series of dental imaging, and it is efficient for a technician to keep together all of a patient's radiation screens from a given imaging session. Having a container of at least this size allows the technician to store, and transport to the scanner, all of the patient's radiation screens from a given session within a single container.

The container preferably includes a label for identifying an origin for the screens. This provides a technician with a mechanism for associating one or more radiation screens with an appropriate imaging session and subject. Such information could be used to identify, for example, a technician and a specific operatory. This is useful since the exposed radiation screens and the images upon them may not include information that allows for the identification of origin.

In one embodiment the interior dark section of the container has sufficiently low light levels to prevent significant shadow formation on a stored radiation screen for at least 20 minutes when the container is exposed to normal operatory lighting conditions. It is advantageous for the interior dark section of the container to have sufficiently low light levels to prevent significant shadow formation on a single radiation storage screen stored within the container for at least 20 minutes when the exterior of the container is exposed to normal operatory lighting conditions. This allows a technician to keep the container within the operatory near the subject during extended sessions, such as full mouth dental imaging sessions, that require the exposure of multiple storage screens.

In one embodiment the container is formed of materials capable of withstanding repeated sterilizations with a cold sterilization solution. Periodic sterilization of the container provides the advantage of minimizing the risk of spreading infectious agents to storage layer radiation screens, the environment of the radiation screen reader, and other areas.

The container is preferably designed to provide easy access to radiation screens stored within it. Access may be provided by an access door in the container. Alternatively, the container can be made up of two pieces connected by latches, whereby one piece may be unlatched and removed from the other, thus providing access to the radiation screens stored inside. Alternatively, the container can be made up of two pieces connected by a snap and hinge, whereby one piece may be unsnapped and swung away from the other, thus providing access to the radiation screens stored inside.

A user can utilize the above invention through the following method: 1) removing an exposed storage layer radiation screen, contained within a screen envelope, from a patient's mouth; and 2) releasing the screen from the screen envelope, without touching the screen, such that the screen drops out of the screen envelope and through an aperture of a container for storing the screen which prevents light exterior to the container from reaching the screen.

In a preferred embodiment of the method the container includes a screen receiving surface which is shaped to direct a screen dropped onto the screen receiving surface into the interior of the container. The aperture should be sized for storage radiation screens used in dental imaging. In a particular embodiment of the method the aperture is sized with a width of at least 0.18 inches and a length of at least 2.125 inches. This sizing allows for the passage of dental X-ray screen sizes 0 to 3.

In one embodiment of the method the container is sized so as to allow the storage of at least twenty dental storage radiation screens. This provides enough volume to store at least one full mouth series of radiation screens.

In one embodiment of the method the interior of the container is sufficiently dark to prevent significant shadow formation on stored screens for at least 20 minutes when the container is exposed to normal operatory lighting conditions.

The method may include the additional step of labeling the container to identify a patient or technician associated with the screen stored within the container.

The method may also include the additional steps of removing the screen from the container and reading the image on the screen.

An embodiment of the container and method of the present invention is discussed herein in greater detail with regard to FIGS. 2–5.

Figure 2:
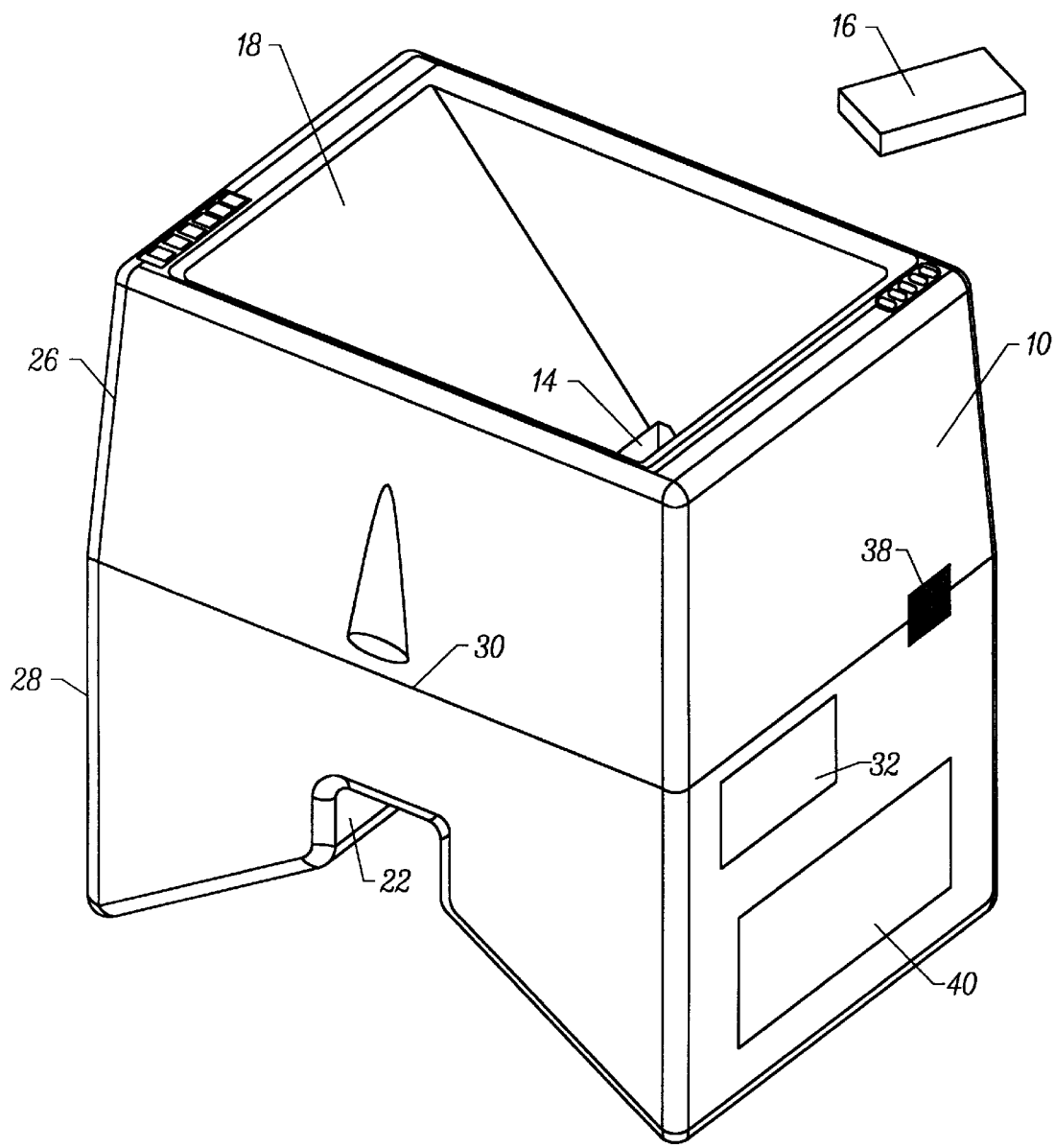
FIG. 2 illustrates an example of a container according to the present invention.

FIG. 2 illustrates an embodiment of the container. As illustrated in FIG. 2, the container includes walls 10, a screen receiving surface 18 onto which a screen is dropped, and an aperture 14 adjacent the screen receiving surface 18 which is sized to allow the passage of a storage layer radiation screen 16 through the aperture 14. The bottom surface of the container makes up an interior guiding section 22.

The container is constructed from two pieces of opaque injection molded plastic. The top piece 26 and bottom piece 28 are tightly connected with a latch 30 on each side of the container. The top piece 26 and bottom piece 28 may be unlatched to provide easy access to screens stored inside the container. Alternatively, the top piece 26 and bottom piece 28 may be connected by a connector and hinge 38. The container may also include an access door 40. The container includes a label 32 for identifying the origin of the storage layer radiation screens stored within the container.

Figure 3A:
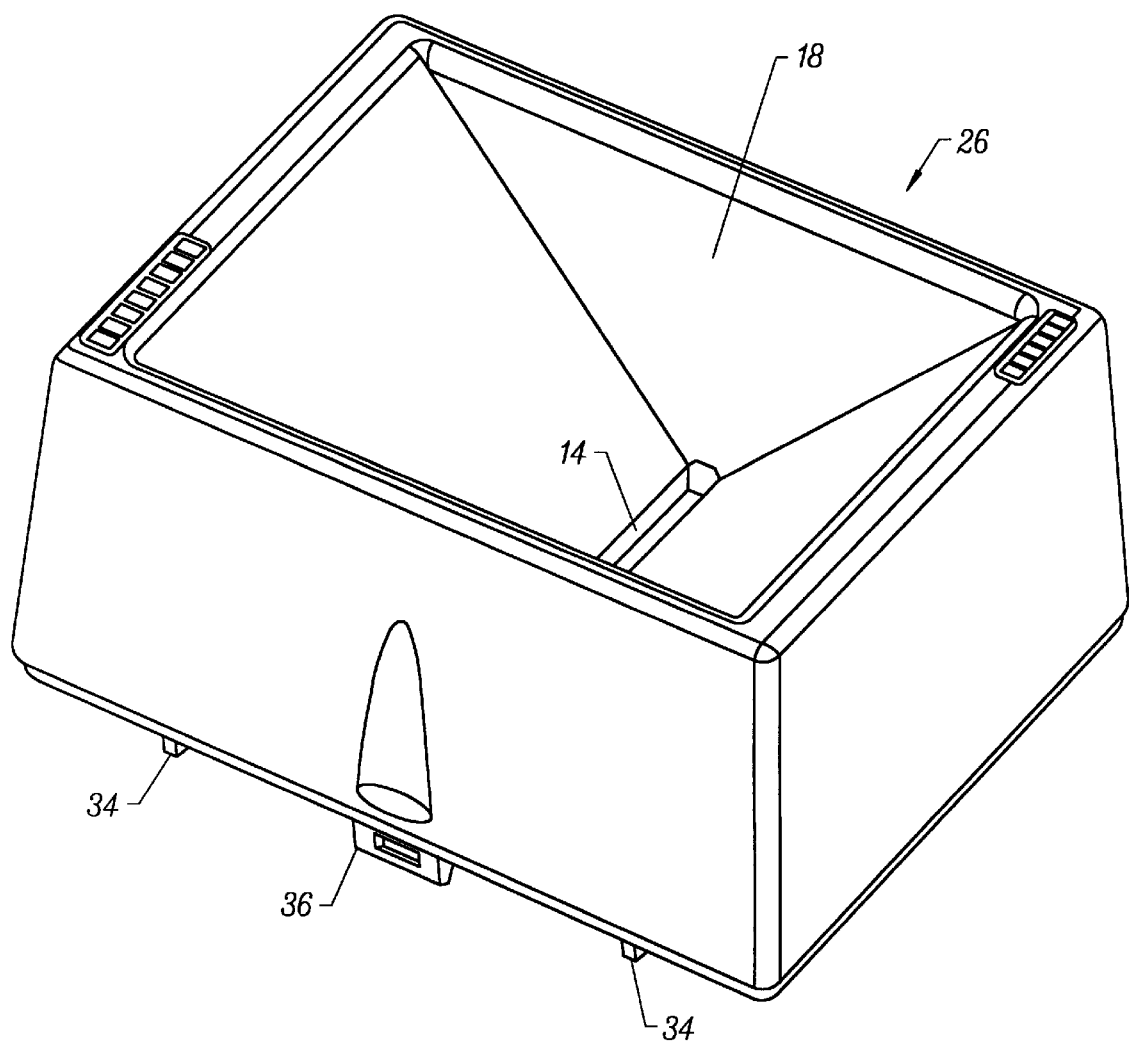
FIGS. 3A–B provide perspective views of the top piece of the container shown in FIG. 2.
Figure 3B:
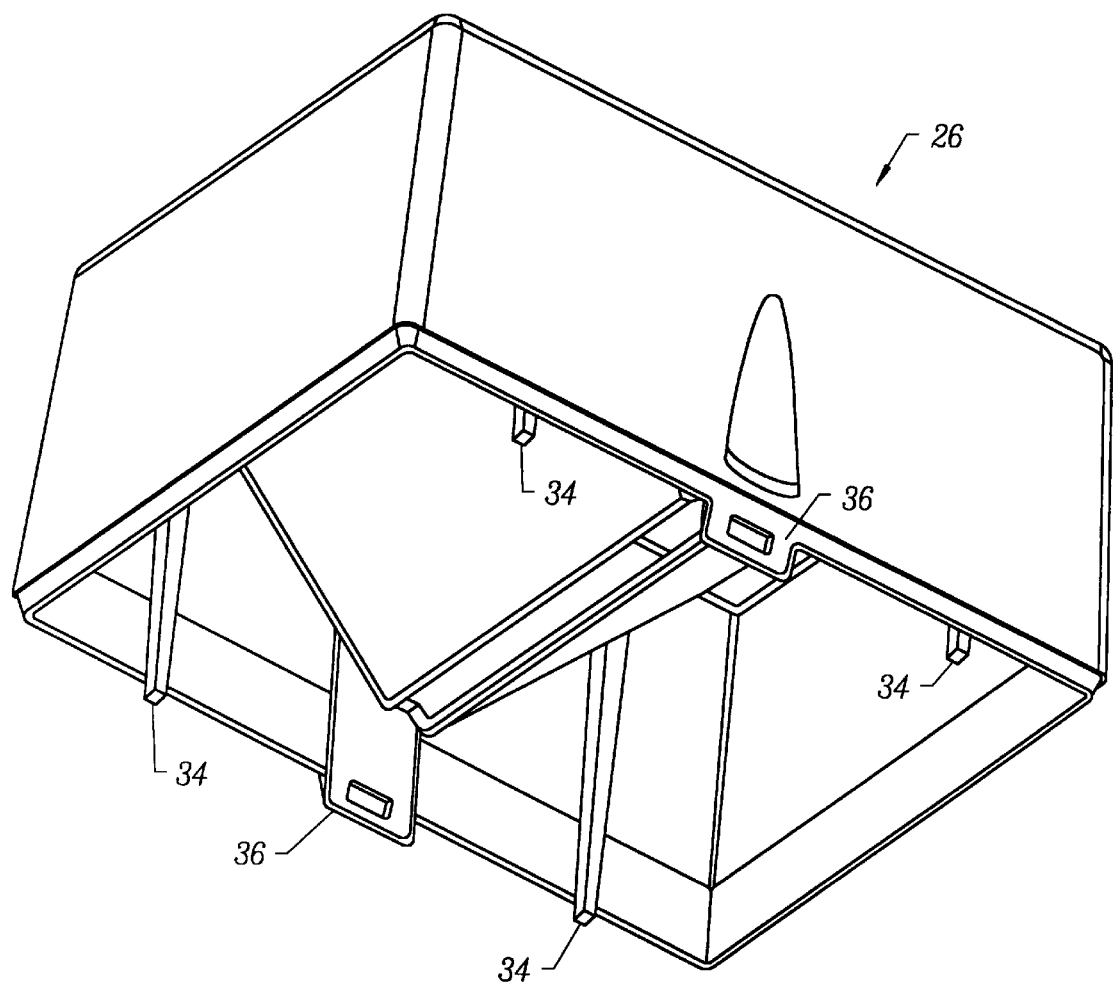

FIGS. 3A–B illustrate top-down and bottom-up view respectively of the top piece 26 of the container. As illustrated in FIG. 3A, the screen receiving surface 18 is shaped like an inverted funnel to guide storage layer radiation screens dropped from above into and through the aperture 14. The aperture 14, located at the bottom of the screen receiving surface 18, is narrow and rectangular in shape. The top piece 26 contains four posts 34 adjacent to the bottom perimeter that allow the top piece 26 to be properly aligned with the bottom piece 28. The top piece 26 also contains the top halves 36 of the latches 30 that allow the top piece 26 and bottom piece 28 to be tightly connected together.

Figure 4A:
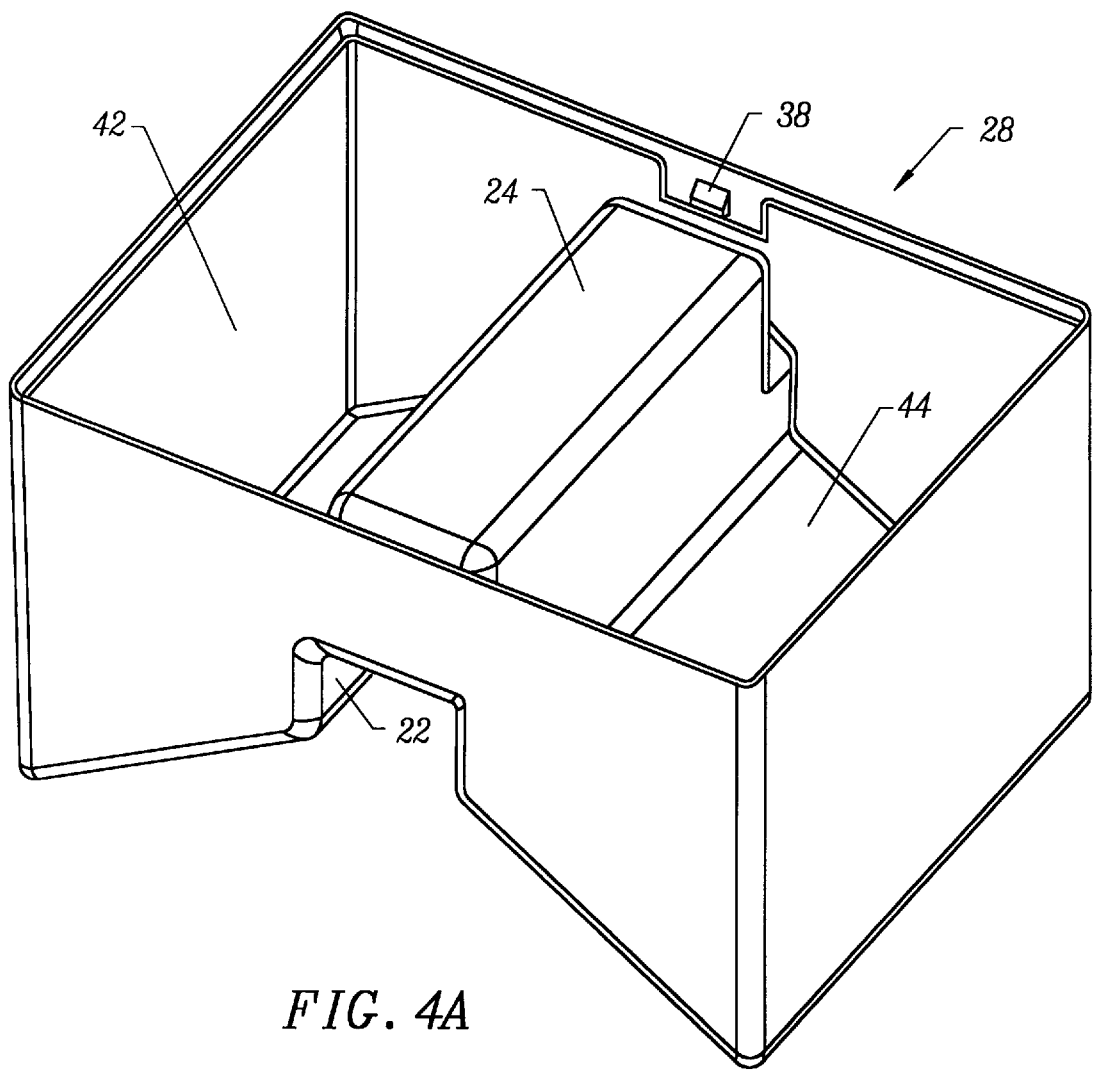
FIGS. 4A–B provide perspective views of the bottom piece of the container shown in FIG. 2.
Figure 4B:
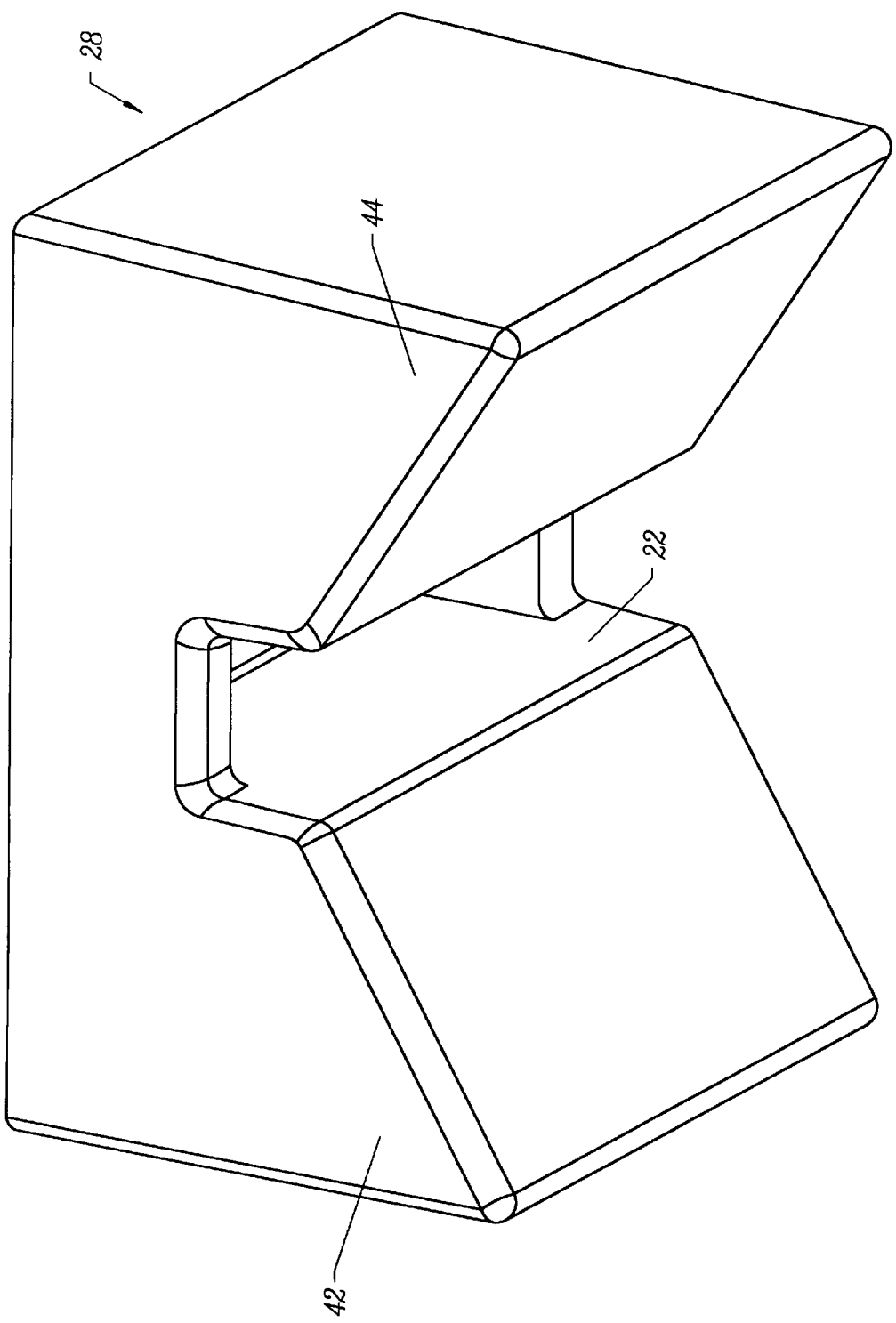

FIGS. 4A–B illustrate top-down and bottom-up views respectively of the bottom piece 28 of the container. As shown in FIGS. 4A–B, the central portion of the bottom piece 28 is raised to form an interior member 24. When the top and bottom pieces are snapped together the interior member 24 is positioned slightly below the aperture 14, and acts to block light entering the aperture. The interior guiding section 22, making up the inside surface of the bottom piece 28, is shaped so that storage layer radiation screens coming through the aperture 14 slide along the interior member 24 and then fall into one of two wells 42, 44. The bottom surface of each well slants away from the interior member 24 so that each radiation screen that passes through the aperture 14 comes to rest with one screen edge abutting a vertical side wall of the bottom piece 28, thus facilitating neat stacking of the radiation screens. As can be seen in FIG. 4A, the bottom piece 28 also contains the bottom halves 38 of the latches 30 that allow the top piece 26 and bottom piece 28 to be tightly connected together.

Figure 5:
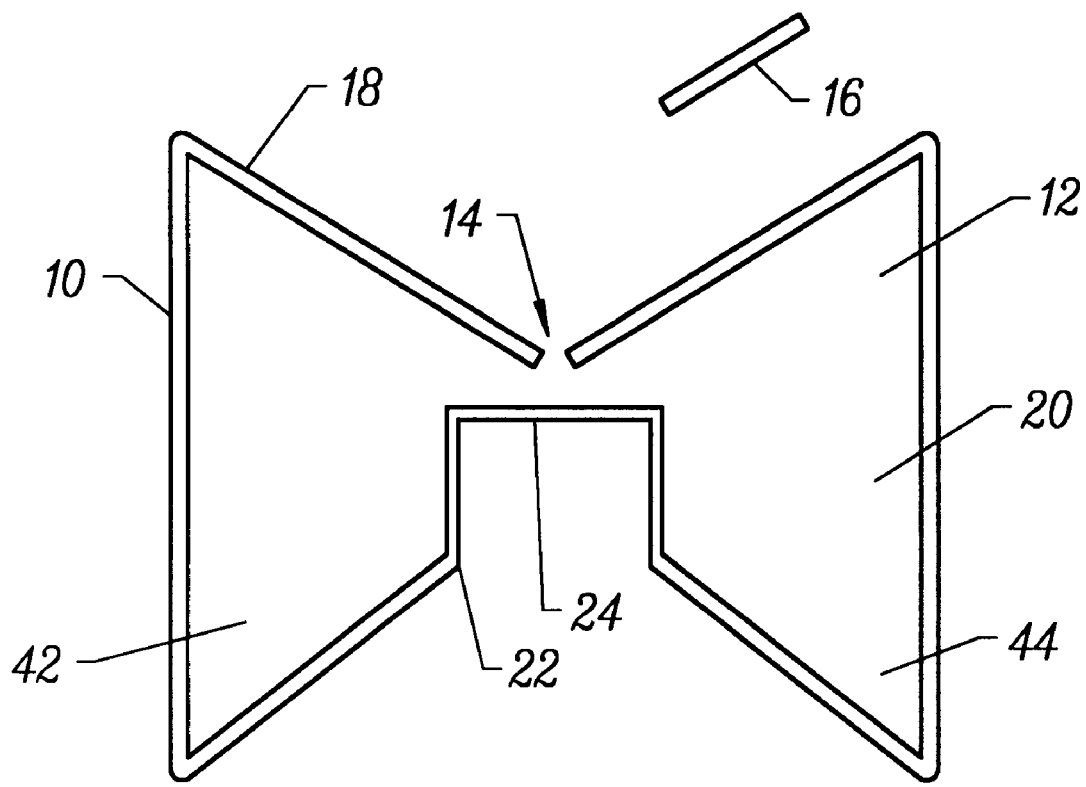
FIG. 5 illustrates a cut-away profile view of the container shown in FIG. 2.

FIG. 5 illustrates a cut-away side view of the container in FIG. 2. As illustrated in FIG. 5, the walls 10 create the interior volume 12. The aperture 14 is located at the bottom of the screen receiving surface 18. The interior member 24 is located slightly below the aperture 14, and acts to block light entering the aperture, thus helping to form the interior dark section 20. The bottom surface of the container creates the interior guiding section 22 that guides radiation screens coming through the aperture 14 to come to rest in neat stacks within the two wells 42, 44.

In one embodiment of a method of using the container, the user removes an exposed storage layer radiation screen, contained within a screen envelope from a patient's mouth. The user then releases the screen from the screen envelope, without touching the screen, such that the screen drops out of the screen envelope and onto the container's screen receiving surface. The screen then slides by gravity along the screen receiving surface through the aperture and to the dark interior of a container. Either before removing the screen from the patient's mouth, or after transferring the screen to the interior of a dark container, the user may label the container to identify the radiation screen inside as associated with a particular patient or technician. The user can then temporally store the screen in the container until it is ready to be scanned. After removal, the image on the screen is read with a scanner such as the one described in U.S. Pat. No. 5,635,728.

The foregoing examples and description of preferred embodiments of the present invention are provided for the purposes of illustration and description. The examples and preferred embodiments, however, are not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A container for storing light sensitive exposed storage layer radiation screens comprising:

walls defining an interior volume;

an aperture in one of the walls of the container sized to allow entry of a storage layer radiation screen into the interior volume;

an inclined surface positioned adjacent to the aperture which causes a screen dropped onto the inclined surface to enter into the interior volume through the aperture without a user having to contact the container;

an interior member positioned within the interior volume which is sized and positioned to prevent light passing through the aperture from directly reaching an interior dark section of the interior volume; and an interior guiding section shaped to direct a screen dropped through the aperture to come to rest in the interior dark section.

2. The container according to claim 1 wherein the interior guiding section and interior dark section are shaped to cause a series of exposed storage layer radiation screens dropped into the container to become stacked upon each other.

3. The container according to claim 1 wherein the inclined surface is sized and shaped to enable screens to be consistently dropped onto the inclined surface and have the screens pass through the aperture into the container without having to handle the container.

4. The container according to claim 1 wherein the walls of the container are formed of non-light transmissive material.

5. The container according to claim 1 wherein the aperture is surrounded by the inclined surface.

6. The container according to claim 1 wherein the aperture is a slit sized for storage radiation screens used in dental imaging.

7. The container according to claim 6 wherein the aperture is a slit sized for dental X-ray screen sizes 0 to 3.

8. The container according to claim 6 wherein the interior dark section of the interior volume is sufficiently larger to store at least one full mouth series of storage phosphor image screens used in dental imaging.

9. The container according to claim 1 wherein the interior dark section has light levels sufficiently low to prevent significant shadow formation on a storage radiation storage screen for at least 20 minutes.

10. The container according to claim 1 wherein the container is formed of materials capable of withstanding repeated sterilizations with a cold sterilization solution.

11. The container according to claim 1 wherein the container is made up of two pieces connected by a connector and hinge, whereby one piece may be unconnected and swung away from the other providing access to the screens.

12. The container according to claim 1 wherein the container is made up of two pieces connected by connectors, whereby one piece may be unconnected and removed from the other providing access to the screens.

13. The container according to claim 1 wherein the container contains an access door providing access to the screens.

14. The container according to claim 1 wherein the container further includes a label for identifying an origin for the screens.

* * * * *